US012775679B2

(12) United States Patent
Werner et al.

(10) Patent No.: US 12,775,679 B2
(45) Date of Patent: Oct. 27, 2026

(54) RELOCALIZATION FOR DEVICE FINDING

(71) Applicant: Apple Inc., Cupertino, CA (US)

(72) Inventors: Benjamin A. Werner, San Jose, CA (US); Anup Dhital, San Jose, CA (US); Tunc Ertan, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 921 days.

(21) Appl. No.: 18/080,730

(22) Filed: Dec. 13, 2022

(65) Prior Publication Data

US 2023/0394111 A1 Dec. 7, 2023

Related U.S. Application Data

(60) Provisional application No. 63/349,035, filed on Jun. 3, 2022.

(51) Int. Cl.
*G06F 18/20* (2023.01)
*G06T 7/70* (2017.01)

(52) U.S. Cl.
CPC ................ *G06F 18/20* (2023.01); *G06T 7/70* (2017.01)

(58) Field of Classification Search
CPC . G06F 18/20; G06T 7/70; G01S 7/006; G01S 13/765; G01S 13/0209; H04W 4/80
See application file for complete search history.

(56) References Cited

U.S. PATENT DOCUMENTS

2011/0177831 A1* 7/2011 Huang ................ G01S 5/02524 455/457
2011/0215969 A1* 9/2011 Hwang ................ H04W 48/16 342/463
2014/0247807 A1* 9/2014 Westerberg ........... H04W 36/34 370/331
2014/0335887 A1* 11/2014 Liu ...................... H04W 64/00 455/456.1
2015/0109983 A1* 4/2015 Zhang ............... H04W 52/0254 370/311
2015/0131639 A1* 5/2015 Hirose ................. H04W 64/00 370/338

(Continued)

OTHER PUBLICATIONS

Globally Consistent Range Scan Alignment for Environment Mapping â 1997 (Year: 1997).*

(Continued)

*Primary Examiner* — Nizar N Sivji
(74) *Attorney, Agent, or Firm* — BAKERHOSTETLER

(57) ABSTRACT

A method is provided that includes at each position of a plurality of positions along a trajectory of a first electronic device within an area: determining a range value corresponding to a distance between the first electronic device and a second electronic device, determining a pose of the first electronic device with respect to a reference coordinate system, and setting and storing an anchor point corresponding to the determined range value and pose. An update to an anchor point set for a current position of the first electronic device is received and the determined pose corresponding to one or more of the set anchor points is updated based on the update to the anchor point set for the current position of the first electronic device. A location of the second electronic device is estimated based on the range values and poses corresponding to the set anchor points.

20 Claims, 4 Drawing Sheets

(56) References Cited

U.S. PATENT DOCUMENTS

| | | | | |
|---|---|---|---|---|
| 2016/0381660 | A1* | 12/2016 | Mittal | H04W 24/08 455/421 |
| 2017/0215164 | A1* | 7/2017 | Disatnik | H04B 7/18554 |
| 2017/0302363 | A1* | 10/2017 | Fan | H04B 7/18504 |
| 2019/0027043 | A1* | 1/2019 | Turato | G07C 5/006 |
| 2019/0268796 | A1* | 8/2019 | Hassan | H04W 28/0226 |
| 2020/0100064 | A1* | 3/2020 | O'Connor | H04W 4/029 |
| 2020/0273235 | A1* | 8/2020 | Emami | G06T 7/50 |
| 2021/0358252 | A1* | 11/2021 | Sabripour | G06T 7/215 |
| 2022/0161759 | A1* | 5/2022 | Hirose | G07C 9/00309 |
| 2023/0276198 | A1* | 8/2023 | Raj | H04W 4/023 455/456.3 |
| 2023/0276395 | A1* | 8/2023 | Kono | H04W 64/00 455/456.1 |
| 2023/0305098 | A1* | 9/2023 | Naiki | H04W 64/00 |
| 2023/0356966 | A1* | 11/2023 | Narendra | B65G 67/04 |

OTHER PUBLICATIONS

Multi-Modal Probabilistic Indoor Localization on a Smartphone—2019 (Year: 2019).*

* cited by examiner

RELOCALIZATION FOR DEVICE FINDING

This application claims the benefit of priority to U.S. Provisional Patent Application No. 63/349,035, entitled "Relocalization for Device Finding", filed on Jun. 3, 2022, the disclosure of which is hereby incorporated in its entirety.

TECHNICAL FIELD

The subject application relates generally to electronic devices, including algorithms for locating electronic devices.

BACKGROUND

Radio technologies such as ultra-wideband (UWB) provide for low-energy, short-range radio communications between electronic devices configured with the technology. The low-energy aspects of UWB communications makes the technology ideal for algorithms that find or locate electronic devices by exchanging radio communications with the electronic devices.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring concepts of the subject technology.

Radio technologies such as ultra-wideband (UWB) provide for low-energy, short-range radio, and high-bandwidth communications between electronic devices configured with the technology. These aspects of UWB communications makes the technology ideal for algorithms that find or locate electronic devices by exchanging radio communications with the electronic devices. For example, the location of an electronic device may be estimated by determining range values corresponding to distances between the electronic device and another electronic device use UWB while the other electronic device is moved along a trajectory in proximity to the electronic device. The determined range values together with location information on positions along the trajectory at which the range values were obtained may be used to estimate the location of the electronic device.

The location information on the positions along the trajectory may be determined relative to a starting position on the trajectory using motion sensor data captured by an inertial measurement unit (IMU), for example, and computer vision analysis of images captured of the area through which the trajectory passes (i.e., visual-inertial odometry (VIO)). Relying on VIO data to determine location information of the positions along the trajectory may result in position errors accumulating at each position along the trajectory. Relocalization provides for correcting and/or supplementing the location information of the positions along the trajectory based on updated information which in turn improves the estimation of the location of the electronic device. The updated information may be based on loop closure where the electronic device moving along the trajectory is determined to be at a position that was previously visited earlier in the trajectory. The updated information also may come from stored maps and location information from previous finding operations or from another electronic device also engaged in the finding operation. The foregoing features and benefits are discussed in more detail below.

Figure 1:
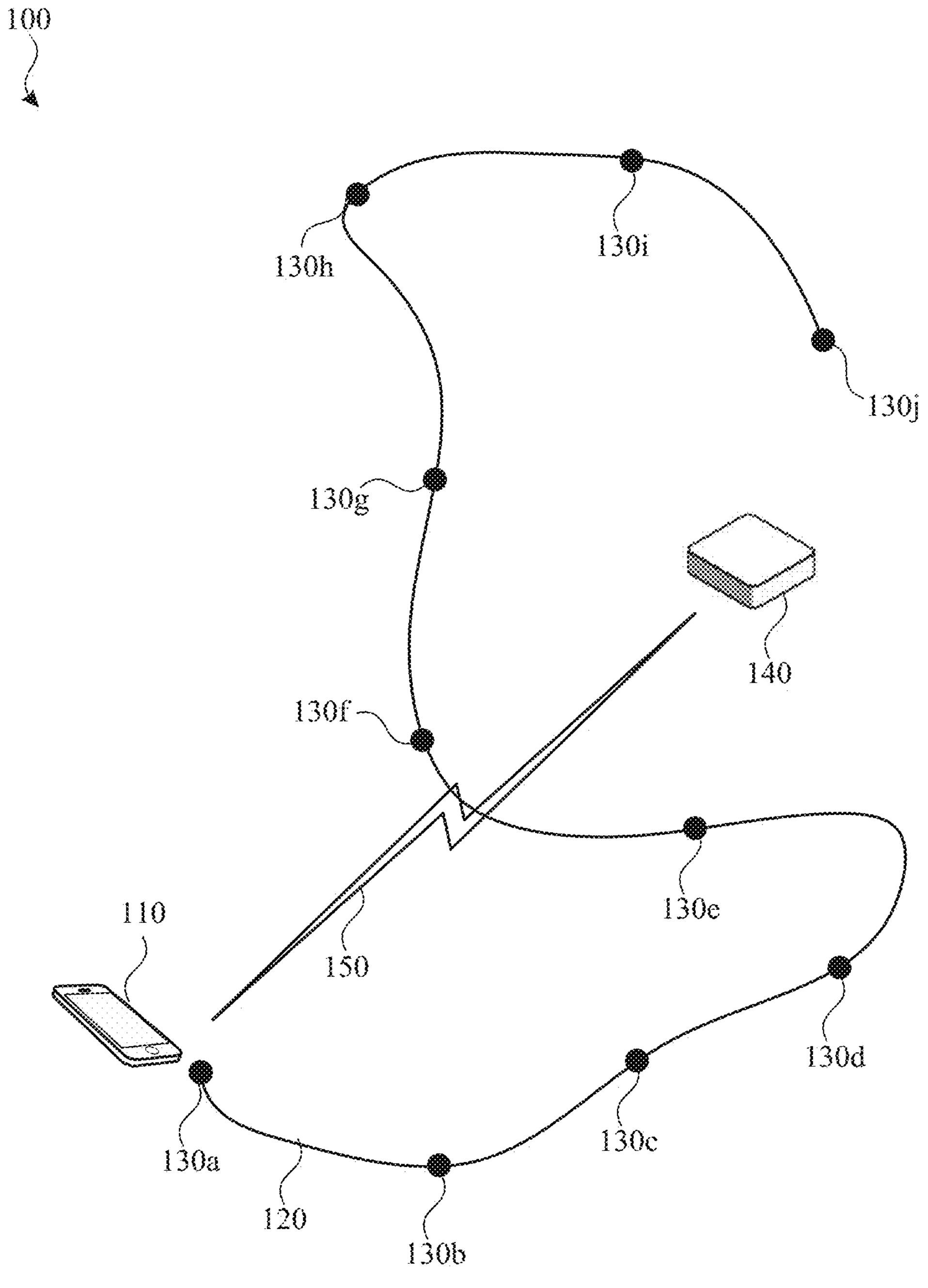
FIG. 1 illustrates an example environment in which the subject technology may operate in accordance with one or more implementations.

FIG. 1 illustrates an example environment 100 in which the subject technology may operate in accordance with one or more implementations. Not all of the depicted components may be used in all implementations, however, and one or more implementations may include additional or different components than those shown in the figure. Variations in the arrangement and type of the components may be made without departing from the scope of the claims as set forth herein. Additional components, different components, or fewer components may be provided.

As illustrated in FIG. 1, environment 100 includes electronic device 110 that is moved along trajectory 120 through positions 130*a*-130*j* in proximity to electronic device 140 as part of a finding operation to locate electronic device 140. The path of trajectory 120 as well as the number and relative locations of positions 130*a*-130*j* represent one example of a trajectory traversed by electronic device 110. The subject technology is not limited to any particular path for the trajectory nor to any particular number and/or relative locations of positions along the trajectory. The positions may be based on periodic timing or may be based on electronic device 110 traversing a predetermined distance along trajectory 120, for example.

At each of positions 130*a*-130*j*, electronic device 110 exchanges ranging messages with electronic device 140 via link 150. According to aspects of the subject technology, link 150 may be implemented using UWB and ranging messages exchanged via link 150 may be used to determine a range value corresponding to a distance between electronic device 110 and electronic device 140. For example, electronic device 110 may use a transmission time observed while sending a first ranging message to electronic device 140 and receiving a second ranging message in response from electronic device 140 to determine the range value.

FIG. 1 depicts electronic device 110 as a smartphone. The subject technology is not limited to electronic device 110 being implemented as a smartphone. For example, electronic device 110 also may be implemented as a laptop computer, a tablet device, a wearable device, or any computing device configured with UWB functionality. Electronic device 140 may represent a smartphone, a laptop computer, a tablet device, a smart home device (e.g., speaker, thermostat, light switch, etc.), a locator tag configured to be attached to an item for which location finding may be desired, or any type of electronic device configured with UWB functionality.

Figure 2:
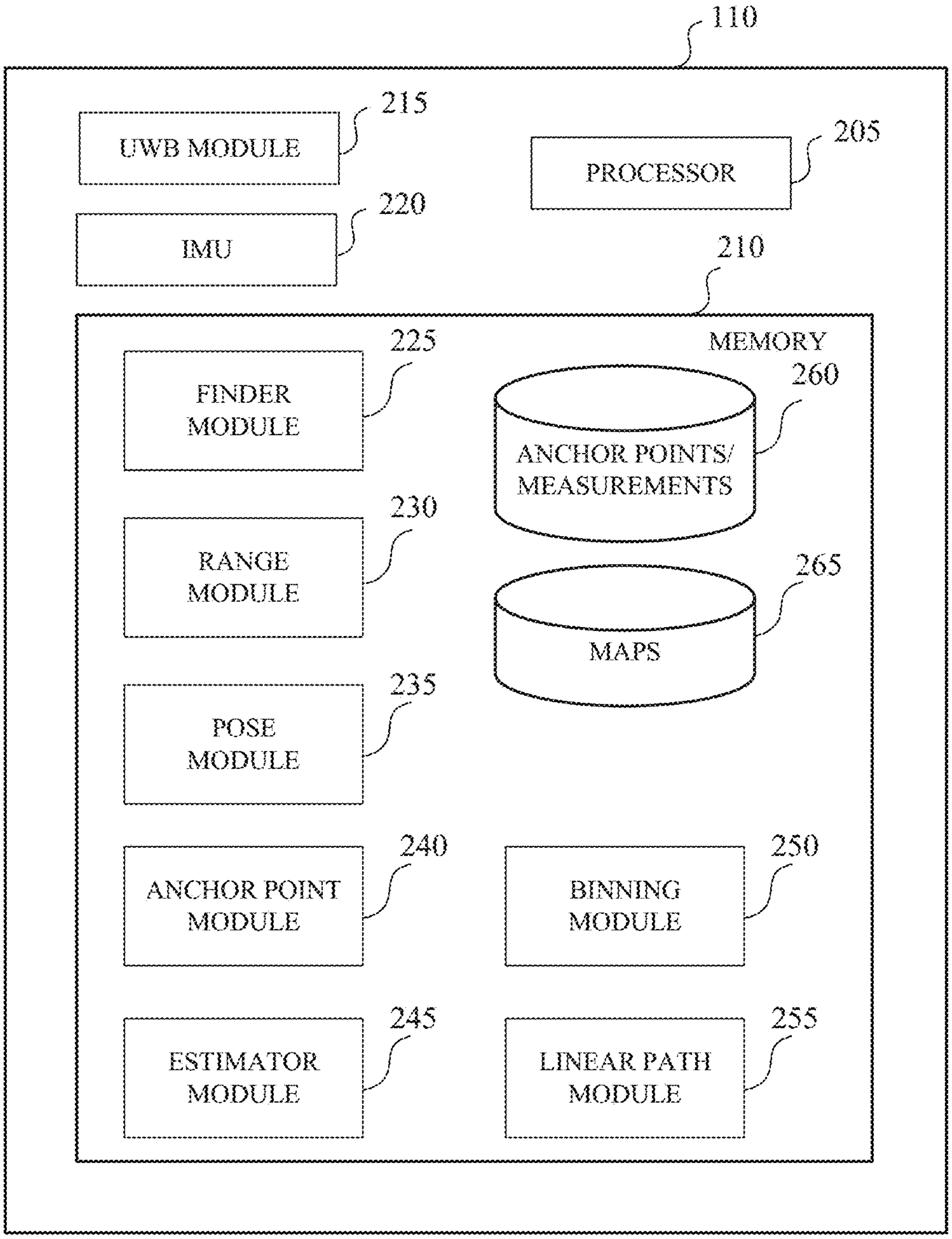
FIG. 2 is a block diagram illustrating components of an electronic device according to aspects of the subject technology.

FIG. 2 is a block diagram illustrating components of electronic device 110 in accordance with one or more implementations of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example depicted in FIG. 2, electronic device 110 includes processor 205, memory 210, UWB module 215, and inertial measurement unit (IMU) 220. Processor 205 may include suitable logic, circuitry, and/or code that enable processing data and/or controlling operations of media device 130. In this regard, processor 205 may be enabled to provide control signals to various other components of electronic device 110. Processor 205 may also control transfers of data between various portions of electronic device 110. Additionally, processor 205 may enable implementation of an operating system or otherwise execute code to manage operations of electronic device 110.

Processor 205 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Memory 210 may include suitable logic, circuitry, and/or code that enable storage of various types of information such as received data, generated data, code, and/or configuration information. Memory 210 may include, for example, random access memory (RAM), read-only memory (ROM), flash memory, and/or magnetic storage.

UWB module 215 may include suitable logic, circuitry, and/or code that enable the initiation and maintaining of UWB communication links with another electronic device. IMU 220 may include suitable logic, circuitry, and/or code that enable the capture of motion data used to determine a pose (position and orientation with respect to a reference coordinate system) of the electronic device. IMU 220 may include one or more accelerometers, gyroscopes, magnetometers. etc.

As depicted in FIG. 2, memory 210 contains finder module 225, range module 230, pose module 235, anchor point module 240, estimator module 245, binning module 250, linear path module 255, anchor points/measurements data store 260, and maps data store 265. The subject technology is not limited to these components both in number and type, and may be implemented using more components or fewer components than are depicted in FIG. 2.

According to aspects of the subject technology, finder module 225 comprises a computer program having one or more sequences of instructions or code together with associated data and settings. Upon executing the instructions or code, one or more processes are initiated to perform a finding operation that estimates a location of another electronic device based on range values determined using UWB module 215 and pose information determined using IMU 220. The other electronic device may be a smartphone or a tablet device, for example, or may be a UWB device that is connected or attached to something the location of which is important to a user. Finder module 225 may be configured to manage the other modules in electronic device 110 to obtain the estimated location of the other electronic device. Finder module 225 also may provide a user interface for display on a display of electronic device 110 to enable a user to launch the location processes described herein via one or more user interface elements to locate the other electronic device, a current location of which may not be known to the user. The user interface also may be configured to display location indicators such as an arrow indicating a direction to the location of the other electronic device. The user interface also may display a distance to the other electronic device based on the determined range values.

According to aspects of the subject technology, range module 230 comprises a computer program having one or more sequences of instructions or code together with associated data and settings. Upon executing the instructions or code, one or more processes are initiated to determine a range value corresponding to a distance between electronic device 110 and the other electronic device. Range module 230 may be initiated by finder module 225 when electronic device 110 is at one of multiple positions along a trajectory. Range module 230 may use UWB module 215 to exchange UWB communications with the other electronic device and determine the range value based on those communications. For example, the range value may be based on a transmission time to the other electronic device and back to electronic device 110. The subject technology is not limited to any particular units or resolution for the determined range value.

According to aspects of the subject technology, pose module 235 comprises one or more sequences of instructions or code together with associated data and settings. Upon executing the instructions or code, one or more processes are initiated that are configured to determine a pose of electronic device 110 with respect to a reference coordinate system. The pose of electronic device 110 may include a position of electronic device 110 within the reference coordinate system and an orientation or heading of electronic device 110 with respect to the reference coordinate system. Pose module 235 may be initiated by finder module 225 when electronic device 110 is beginning to traverse the trajectory. Pose module 235 may use IMU 220 to estimate the pose of electronic device 110 at each of the multiple positions along the trajectory. Pose module 235 also may use images of the area in which electronic device 110 is traversing the trajectory together with the inertial measurements provided by IMU 220 for visual-inertial odometry to determine the pose of electronic device 110 at each of the positions along the trajectory. The reference coordinate system may be determined using computer vision analysis of captured images of the area in which electronic device 110 traverses the trajectory. The computer vision analysis may identify surfaces and objects within the area as well as their respective orientations and base the reference coordinate system on the identified surfaces and objects.

According to aspects of the subject technology, anchor point module 240 comprises one or more sequences of instructions or code together with associated data and settings. Upon executing the instructions or code, one or more processes are initiated that are configured to set and manage anchor points. An anchor point identified by an anchor point identifier is set for each pair of a range value determined by range module 230 and a pose determined by pose module

235 for a position along the trajectory. The anchor point may be a location or position relative to real-world items (e.g., objects, images, surfaces, etc.) in the area around electronic device 110 that are detectable using one or more sensors in electronic device 110. The anchor point may be used to correlate the position of the pose with the position relative to the real-world items. Anchor point module 240 stores each anchor point in anchor points/measurements data store 260. Pairs of range values and poses associated with the stored anchor points may be stored in anchor points/measurements data store 260, together with the corresponding anchor point identifiers, as a measurement history.

Anchor point module 240 may receive an update to one of the anchor points stored in data store 260 indicating that a location of the anchor point has changed. For example, with loop closure the current position of electronic device 110 along the trajectory may appear to match a previous position along the trajectory through which electronic device 110 has passed. However, the location of the anchor point set for the pair of range value and pose determined for the electronic device 110 at the current position may not match the location of the anchor point set for the previous position along the trajectory. In this situation, the difference in location of the anchor points may indicate that electronic device 110 has drifted from an expected path along the trajectory due to the use of inertial measurements and the associated accumulation of position error involved in determining the current location of electronic device 110. The change in the location of the anchor point indicated in the update may be used to adjust the locations of the poses along the trajectory to correct for the drift. A translator may be configured to relocalize the poses based on the change in the location of the anchor point and may set a relocalization flag indicating that the changes have been made.

Other situations may result in updates to anchor points stored in data store 260. For example, a user may have previously used a finding operation to look for and locate an electronic device that either the user left in place or is fixed in its location. The finder module 225 may select a map stored in data store 265 generated during the previous location finding operation to supplement or replace the anchor points set for the trajectory traversed by electronic device 110 when the current real-world location is determined to correspond with the real-world location of the previous location finding operation. Each map includes the anchor points set for the previous finding operation as well as the locations of the electronic devices involved in that finding operation. Status information obtained from the electronic device being sought may indicate the timing of the last movement of the electronic device based on IMU or GPS data, for example. If the electronic device has not moved since the previous finding operation, the current location of electronic device 110 within the map may be determined and the anchor points with the corresponding range values and pose information may be added to the anchor points set for the current finding operation by anchor point module 240. The poses of electronic device 110 corresponding to anchor points set for the current finding operation may need to be translated to the reference coordinate system determined in connection with the previous finding operation. Alternatively, if the map from a previous finding operation is selected for use in a current finding operation, the current finding operation may rely on the anchor points from the previous finding operation and skip traversing electronic device 110 through the positions of the trajectory.

According to other examples, finder module 225 may collaborate with the finder module of another electronic device performing its own finding operation to find the same electronic device. The two electronic devices may be participating in a collaborative augmented reality session. In this example, the two electronic devices performing finding operations determine their respective positions relative to each other and one of the electronic devices adopts the reference coordinate system determined and being used by the other electronic device in the finding operation. The electronic device adopting the reference coordinate system of the other electronic device translates the anchor point set for its current position into the other reference coordinate system. In addition, one or more other anchor points previously set and stored may be translated into the other reference coordinate system. Once both electronic devices are working within the same reference coordinate system and all of the anchor points set and stored are aligned with the same reference system, the two electronic devices may share their respective anchor points with the other electronic device to supplement that electronic device's set anchor points used to estimate the location of the sought-after electronic device.

According to aspects of the subject technology, estimator module 245 comprises one or more sequences of instructions or code together with associated data and settings. Upon executing the instructions or code, one or more processes are initiated that are configured to estimate a location of electronic device 140, for example, based on the range values and poses corresponding to the stored anchor points. For example, estimator module 245 may use a least-squares estimator to estimate the location of electronic device 140 from the range value and pose pairs corresponding to the stored anchor points. The least-squares estimator may provide a confidence metric associated with the estimated location of the electronic device 140. The confidence metric may reflect the likelihood that the estimated location of electronic device 140 is correct. According to aspects of the subject technology, finder module 225 may compare the confidence metric provided by estimator module 245 with a threshold and, if the confidence metric satisfies the threshold indicating that the likelihood of the estimated location of electronic device 140 being correct greater than or equal to a predetermined minimum likelihood, finder module 225 may provide for display on a display of electronic device 110 an arrow oriented towards the estimated location of electronic device 140.

According to aspects of the subject technology, binning module 250 comprises one or more sequences of instructions or code together with associated data and settings. Upon executing the instructions or code, one or more processes are initiated that are configured to aggregate range values determined for positions of electronic device 110 along the trajectory that are within a pre-defined distance from one another. The pre-defined distance may be based on an amount of noise in the range value measurements. For example, if the range value measurements are accurate to within 10 cm the pre-defined distance may be set to 20 cm. When multiple range values are determined for positions within close proximity to one another, the determined range values become redundant and may bias the estimated location. To remove the redundant information and the bias, a single range value is used for the entire subset of positions that fall within the pre-defined distance. The single range value may be determined using a variety of techniques. For example, an average of the range values may be used. Tails of the distribution of range values may be removed before determining the average of the remaining range values.

Alternatively, the smallest range value determined within the subset of positions may be used as the single representative range value.

According to aspects of the subject technology, linear path module 255 comprises one or more sequences of instructions or code together with associated data and settings. Upon executing the instructions or code, one or more processes are initiated that are configured to provide a linear path solver configured to determine if the electronic device traversing the trajectory is moving in a straight path towards the location of the other electronic device for which the location is being sought. As noted above, estimator module 245 may use a least-squares estimator to estimate the location of the other electronic device. A least-squares estimator may not produce a workable location estimate, or may produce a location estimate with a relatively low confidence metric, unless the electronic device is traversing a trajectory in more than one direction with respect to the other electronic device.

According to aspects of the subject technology, linear path module 255 determines if the electronic device is traversing a trajectory having a straight path towards the electronic device being sought (i.e., movement in one direction with respect to the other electronic device) based on the range values and the corresponding locations at which the range values were determined for sequential positions along the trajectory. In particular, a difference between range values determined at two sequential positions along the trajectory may be compared against a difference between the locations of the poses determined at the two sequential positions along the trajectory. For example, if the range values determined at two sequential positions along the trajectory were 5 meters and 2 meters, producing a difference of 3 meters, and the difference between the locations of the poses determined at the two sequential positions also was 3 meters, linear path module 255 would determine that the electronic device is traversing a trajectory having a straight path towards the other electronic device. The straight-path trajectory indicates that the other electronic device is located in a relatively small area of possible locations in the direction of the trajectory. If a straight-path trajectory is determined by linear path module 255, finder module 225 may be configured to provide an arrow oriented towards the other electronic device in the direction of the trajectory for display on electronic device 110. In addition, finder module 225 also may provide a distance to the other electronic device based on the determined range values for display on electronic device 110.

Figure 3:
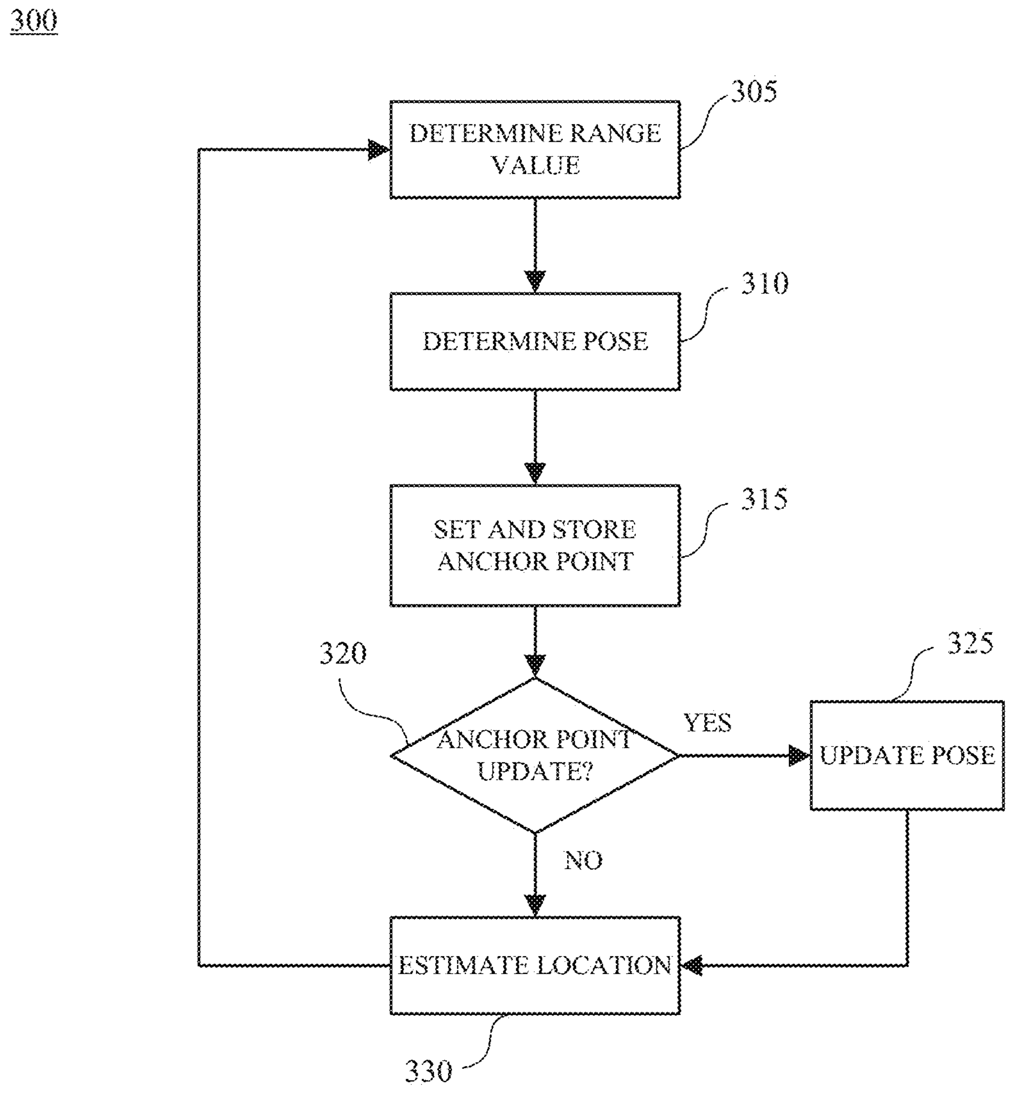
FIG. 3 is a flowchart illustrating an example process for estimating a location of an electronic device according to aspects of the subject technology.

FIG. 3 illustrates an example process for estimating the location of an electronic device according to aspects of the subject technology. For explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

Finder module 225 may start process 300 in response to a location process being initiated by a user via a user interface provided for display by finder module 225 or initiated by another process on electronic device 110 such as an audio cue or initiation. For a first position along a trajectory being traversed by electronic device 110, a range value corresponding to a distance between electronic device 110 and electronic device 140 is determined by range module 230 (block 305). For the same first position along the trajectory, a pose of electronic device 110 with respect to a reference coordinate system is determined by pose module 235 (block 310). An anchor point corresponding to the determined range value and pose is set and stored in data store 260 (block 315).

As discussed above, relocalization to update anchor points may occur in different situations such as loop closure where a current position along the trajectory of electronic device 110 is determined to match a previous position along the trajectory of electronic device 110, using a saved map of a previously completed location process, and/or using a common reference coordinate system with another electronic device performing a location operation for the same electronic device and sharing stored anchor points and the corresponding range values and poses with the other electronic device. If an update to one or more stored anchor points is received (block 320), the locations of one or more poses corresponding to the stored anchor points are updated (block 325). If no updates to the stored anchor points have been received (block 320), or the locations of one or more poses corresponding to the stored anchor points are updated, a location of electronic device 140 is estimated by estimator module 245 and provided to finder module 225 (block 330). This estimation provided by estimator module 245 may be a re-estimation of the location of electronic device 140 estimated before the locations of one or more poses were updated. The process then returns to determine a range value corresponding to a distance between electronic device 110 and electronic device 140 for a next position along the trajectory (block 305).

The least-squares estimator implemented by estimator module 245 may require a minimum number of range value—pose pairs in order to provide a workable estimation of the location of electronic device 140. Accordingly, block 330 may be skipped until the number of anchor points and corresponding range values and poses stored satisfies a threshold value.

Figure 4:
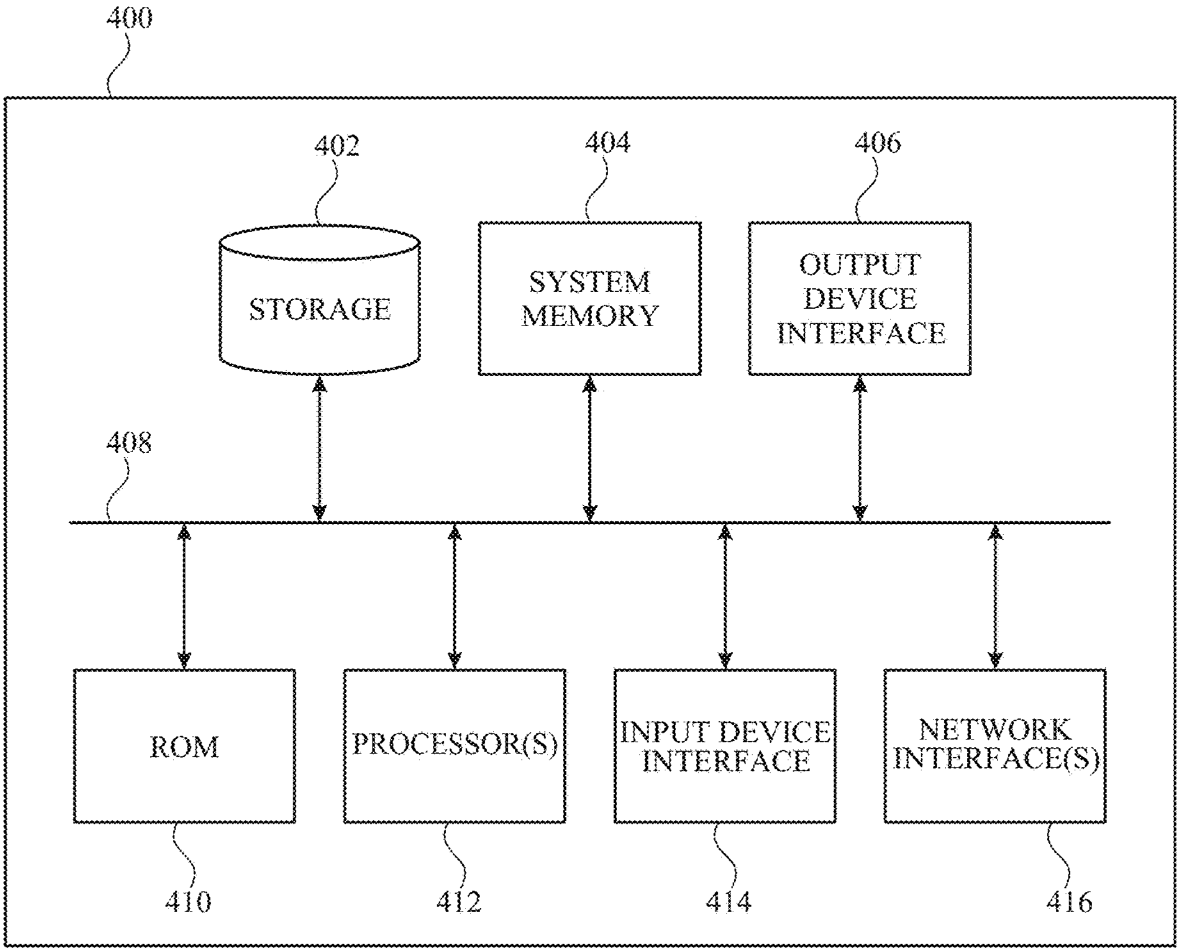
FIG. 4 illustrates an example system with which aspects of the subject technology may be implemented in accordance with one or more implementations.

FIG. 4 illustrates an electronic system 400 with which one or more implementations of the subject technology may be implemented. Electronic system 400 can be, and/or can be a part of, one or more of electronic devices 110 or 140 shown in FIG. 1. The electronic system 400 may include various types of computer readable media and interfaces for various other types of computer readable media. The electronic system 400 includes a bus 408, one or more processing unit(s) 412, a system memory 404 (and/or buffer), a ROM 410, a permanent storage device 402, an input device interface 414, an output device interface 406, and one or more network interfaces 416, or subsets and variations thereof.

The bus 408 collectively represents all system, peripheral, and chipset buses that communicatively connect the numerous internal devices of the electronic system 400. In one or more implementations, the bus 408 communicatively connects the one or more processing unit(s) 412 with the ROM 410, the system memory 404, and the permanent storage device 402. From these various memory units, the one or more processing unit(s) 412 retrieves instructions to execute and data to process in order to execute the processes of the subject disclosure. The one or more processing unit(s) 412 can be a single processor or a multi-core processor in different implementations.

The ROM 410 stores static data and instructions that are needed by the one or more processing unit(s) 412 and other modules of the electronic system 400. The permanent storage device 402, on the other hand, may be a read-and-write memory device. The permanent storage device 402 may be a non-volatile memory unit that stores instructions and data even when the electronic system 400 is off. In one or more implementations, a mass-storage device (such as a magnetic or optical disk and its corresponding disk drive) may be used as the permanent storage device 402.

In one or more implementations, a removable storage device (such as a floppy disk, flash drive, and its corresponding disk drive) may be used as the permanent storage device 402. Like the permanent storage device 402, the system memory 404 may be a read-and-write memory device. However, unlike the permanent storage device 402, the system memory 404 may be a volatile read-and-write memory, such as random access memory. The system memory 404 may store any of the instructions and data that one or more processing unit(s) 412 may need at runtime. In one or more implementations, the processes of the subject disclosure are stored in the system memory 404, the permanent storage device 402, and/or the ROM 410. From these various memory units, the one or more processing unit(s) 412 retrieves instructions to execute and data to process in order to execute the processes of one or more implementations.

The bus 408 also connects to the input and output device interfaces 414 and 406. The input device interface 414 enables a user to communicate information and select commands to the electronic system 400. Input devices that may be used with the input device interface 414 may include, for example, alphanumeric keyboards and pointing devices (also called "cursor control devices"). The output device interface 406 may enable, for example, the display of images generated by electronic system 400. Output devices that may be used with the output device interface 406 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, the bus 408 also couples the electronic system 400 to one or more networks and/or to one or more network nodes, such as the content provider 112 shown in FIG. 1, through the one or more network interface (s) 416. In this manner, the electronic system 400 can be a part of a network of computers (such as a LAN, a wide area network ("WAN"), or an Intranet, or a network of networks, such as the Internet. Any or all components of the electronic system 400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

According to aspects of the subject technology, a method is provided that includes at each position of a plurality of positions along a trajectory of a first electronic device within an area: determining a range value corresponding to a distance between the first electronic device and a second electronic device, determining a pose of the first electronic device with respect to a reference coordinate system, and setting and storing an anchor point corresponding to the determined range value and pose. An update to an anchor point set for a current position of the first electronic device is received and the determined pose corresponding to one or more of the set anchor points is updated based on the update to the anchor point set for the current position of the first electronic device. A location of the second electronic device is estimated based on the range values and poses corresponding to the set anchor points.

Estimating the location of the second electronic device may include re-estimating a location of the second electronic device estimated based on range values and poses corresponding to the set anchor points before the determined pose corresponding to one or more of the set anchor points was updated. The pose may include a location and an orientation of the first electronic device, and wherein updating the determined pose may include updating the determined location of the first electronic device. The method may further include determining that a current position along the trajectory of the first electronic device matches a previous position along the trajectory of the first electronic device, where the determined location of the first electronic device may be updated based on a difference between the location of the first electronic device corresponding to the anchor point set for the current position and the location of the first electronic device corresponding to the anchor point set for the previous position.

The method may further include determining a location corresponding to the anchor point set for the current position of the electronic device in a saved map of the area, where the update to the anchor point set for the current position of the electronic device may include changing the reference coordinate system to a new coordinate system associated with the saved map of the area. The saved map of the area comprises one or more saved anchor points with corresponding range values and poses, and wherein the location of the second electronic device may be estimated based on range values and poses corresponding to the saved anchor points.

The method may further include determining a position of the first electronic device relative to a third electronic device in the area, where the update to the anchor point set for the current position of the electronic device may include changing the reference coordinate system to a new coordinate system associated with the third electronic device. The method may further include receiving one or more anchor points with corresponding range values and poses from the third electronic device, where the location of the second electronic device may be estimated based on the range values and poses corresponding to the anchor points received from the third electronic device.

The method may further include determining a subset of positions from the plurality of positions along the trajectory of the first electronic device that are within a pre-defined distance from one another, determining a single range value and a single pose from the range values and the poses determined for the positions of the subset of positions, and setting and storing an anchor point corresponding to the single range value and the single pose. The single range value may be determined by averaging the range values determined for the positions of the subset of positions.

The location of the second electronic device may be estimated using a least-squares estimator that provides a confidence metric associated with the estimated location of the second electronic device, and the method may further include comparing the confidence metric with a threshold, and providing, for display on the first electronic device, an arrow oriented towards the estimated location of the second electronic device if the confidence metric satisfies the threshold.

The method may further include comparing a difference between range values determined at successive points along the trajectory of the first electronic device with a difference between locations from the poses determined at the successive points along the trajectory of the first electronic device, and providing, for display on the first electronic device, an arrow oriented in a direction based on the locations from the poses determined at the successive points along the trajectory if the difference between range values matches the distance between locations.

According to aspects of the subject technology, a non-transitory computer-readable medium storing instructions which, when executed by one or more processors, cause the one or more processors to perform operations is provided. The operations include at each position of a plurality of positions along a trajectory of a first electronic device within an area: determining a range value corresponding to a distance between the first electronic device and a second electronic device, and determining a pose of the first electronic device, wherein the pose comprises a location and an orientation of the first electronic device with respect to a reference coordinate system. The operations further include separating the plurality of positions into a plurality of subsets of positions based on the locations from the poses determined at the respective positions, for each subset of positions, determining a single range value and a single pose from the range values and the poses determined for the positions in the subset of positions, setting and storing an anchor point corresponding to the single range value and single pose for each of the subsets of positions, and estimating a location of the second electronic device based on the range values and the poses corresponding to the set anchor points.

The single range value for each subset of positions may be determined by averaging the range values determined for the positions of the respective subset of positions. The location of the second electronic device may be estimated using a least-squares estimator that provides a confidence metric associated with the estimated location of the second electronic device. The operations may further comprise comparing the confidence metric with a threshold, and providing, for display on the first electronic device, an arrow oriented towards the estimated location of the second electronic device if the confidence metric satisfies the threshold.

The operations may further include receiving an update to an anchor point set for a subset of positions containing a current position of the first electronic device, updating the location of the single pose determined for the subset of positions containing the current position of the first electronic device, and re-estimating the location of the second electronic device based on the range values and the poses corresponding to the set anchor points.

The operations may further include comparing a difference between range values determined at successive points along the trajectory of the first electronic device with a difference between locations from the poses determined at the successive points along the trajectory of the first electronic device, and providing, for display on the first electronic device, an arrow oriented in a direction based on the locations from the poses determined at the successive points along the trajectory if the difference between range values matches the distance between locations.

According to aspects of the subject technology, an electronic device is provided that includes a memory storing a plurality of computer programs, and one or more processors configured to execute instructions of the plurality of computer programs. The instructions include instructions to at each position of a plurality of positions along a trajectory of a first electronic device within an area: determine a range value corresponding to a distance between the first electronic device and a second electronic device, and determine a pose of the first electronic device with respect to a reference coordinate system, wherein the pose comprises a location and an orientation of the first electronic device with respect to a reference coordinate system. The instructions further include instructions to compare a difference between range values determined at successive points along the trajectory of the first electronic device with a difference between locations from the poses determined at the successive points along the trajectory of the first electronic device, and provide, for display on the first electronic device, an arrow oriented in a direction based on the locations from the poses determined at the successive points along the trajectory if the difference between range values matches the distance between locations.

The one or more processors may be configured to execute the instructions to: set and store an anchor point corresponding to the range value and the pose determined for each respective position along the trajectory, receive an update to an anchor point set for a current position of the first electronic device, update the determined pose corresponding to one or more of the set anchor points based on the update to the anchor point set for the current position of the first electronic device, and estimate a location of the second electronic device based on the range values and the poses corresponding to the set anchor points.

The one or more processors may be configured to execute instructions to: determine a subset of positions from the plurality of positions along the trajectory of the first electronic device that are within a pre-defined distance from one another, determine a single range value and a single pose from the range values and the poses determined for the positions of the subset of positions, and set and store an anchor point corresponding to the single range value and the single pose.

As described herein, aspects of the subject technology may include the collection and transfer of data from an application to other computing devices. The present disclosure contemplates that in some instances, this collected data may include personal information data that uniquely identifies or can be used to identify a specific person. Such personal information data can include demographic data, location-based data, online identifiers, telephone numbers, email addresses, home addresses, images, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in estimating the location of electronic devices. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of video conferencing, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
- at each position of a plurality of positions along a trajectory of a first electronic device within an area:
  - determining, by the first electronic device, a range value corresponding to a distance between the first electronic device and a second electronic device based on a wireless ranging communication transmitted by the first electronic device to the second electronic device;
  - determining a pose of the first electronic device with respect to a reference coordinate system; and
  - setting and storing an anchor point corresponding to the determined range value and pose;
- receiving an update to an anchor point set for a current position of the first electronic device;
- updating the determined pose corresponding to one or more of the set anchor points based on the update to the anchor point set for the current position of the first electronic device; and
- estimating a location of the second electronic device based on the range values and poses corresponding to the set anchor points.

2. The method of claim 1, wherein estimating the location of the second electronic device comprises re-estimating a location of the second electronic device estimated based on range values and poses corresponding to the set anchor points before the determined pose corresponding to one or more of the set anchor points was updated.

3. The method of claim 1, wherein the pose comprises a location and an orientation of the first electronic device, and wherein updating the determined pose comprises updating the determined location of the first electronic device.

4. The method of claim 3, further comprising:
- determining that a current position along the trajectory of the first electronic device matches a previous position along the trajectory of the first electronic device,
- wherein the determined location of the first electronic device is updated based on a difference between the location of the first electronic device corresponding to the anchor point set for the current position and the location of the first electronic device corresponding to the anchor point set for the previous position.

5. The method of claim 1, further comprising:

determining a location corresponding to the anchor point set for the current position of the electronic device in a saved map of the area, wherein the update to the anchor point set for the current position of the electronic device comprises changing the reference coordinate system to a new coordinate system associated with the saved map of the area.

6. The method of claim 5, wherein the saved map of the area comprises one or more saved anchor points with corresponding range values and poses, and wherein the location of the second electronic device is estimated based on range values and poses corresponding to the saved anchor points.

7. The method of claim 1, further comprising:

determining a position of the first electronic device relative to a third electronic device in the area, wherein the update to the anchor point set for the current position of the electronic device comprises changing the reference coordinate system to a new coordinate system associated with the third electronic device.

8. The method of claim 7, further comprising:

receiving one or more anchor points with corresponding range values and poses from the third electronic device, wherein the location of the second electronic device is estimated based on the range values and poses corresponding to the anchor points received from the third electronic device.

9. The method of claim 1, further comprising:

determining a subset of positions from the plurality of positions along the trajectory of the first electronic device that are within a pre-defined distance from one another;

determining a single range value and a single pose from the range values and the poses determined for the positions of the subset of positions; and setting and storing an anchor point corresponding to the single range value and the single pose.

10. The method of claim 9, wherein the single range value is determined by averaging the range values determined for the positions of the subset of positions.

11. The method of claim 1, wherein the location of the second electronic device is estimated using a least-squares estimator that provides a confidence metric associated with the estimated location of the second electronic device, and wherein the method further comprises:

comparing the confidence metric with a threshold; and providing, for display on the first electronic device, an arrow oriented towards the estimated location of the second electronic device if the confidence metric satisfies the threshold.

12. The method of claim 1, further comprising:

comparing a difference between range values determined at successive points along the trajectory of the first electronic device with a difference between locations from the poses determined at the successive points along the trajectory of the first electronic device; and providing, for display on the first electronic device, an arrow oriented in a direction based on the locations from the poses determined at the successive points along the trajectory if the difference between range values matches the distance between locations.

13. A non-transitory computer-readable medium storing instructions which, when executed by one or more processors, cause the one or more processors to perform operations comprising:

at each position of a plurality of positions along a trajectory of a first electronic device within an area:

determining, by the first electronic device, a range value corresponding to a distance between the first electronic device and a second electronic device based on a wireless ranging communication transmitted by the first electronic device to the second electronic device;

determining a pose of the first electronic device with respect to a reference coordinate system; and setting and storing an anchor point corresponding to the determined range value and pose;

receiving an update to an anchor point set for a current position of the first electronic device;

updating the determined pose corresponding to one or more of the set anchor points based on the update to the anchor point set for the current position of the first electronic device; and estimating a location of the second electronic device based on the range values and poses corresponding to the set anchor points.

14. The non-transitory computer-readable medium of claim 13, wherein estimating the location of the second electronic device comprises re-estimating a location of the second electronic device estimated based on range values and poses corresponding to the set anchor points before the determined pose corresponding to one or more of the set anchor points was updated.

15. The non-transitory computer-readable medium of claim 13, wherein the pose comprises a location and an orientation of the first electronic device, and wherein updating the determined pose comprises updating the determined location of the first electronic device.

16. The non-transitory computer-readable medium of claim 15, where the operations further comprise:

determining that a current position along the trajectory of the first electronic device matches a previous position along the trajectory of the first electronic device, wherein the determined location of the first electronic device is updated based on a difference between the location of the first electronic device corresponding to the anchor point set for the current position and the location of the first electronic device corresponding to the anchor point set for the previous position.

17. The non-transitory computer-readable medium of claim 13, wherein the operations further comprise:

determining a location corresponding to the anchor point set for the current position of the electronic device in a saved map of the area, wherein the update to the anchor point set for the current position of the electronic device comprises changing the reference coordinate system to a new coordinate system associated with the saved map of the area.

18. The non-transitory computer-readable medium of claim 13, wherein the operations further comprise:

separating the plurality of positions into a plurality of subsets of positions based on the locations from the poses determined at the respective positions; and for each subset of positions, determining a single range value and a single pose from the range values and the poses determined for the positions in the subset of positions, wherein setting and storing an anchor point comprises setting and storing an anchor point corresponding to the single range value and single pose for each of the subsets of positions.

19. The non-transitory computer-readable medium of claim 13, wherein the operations further comprise:

comparing a difference between range values determined at successive positions along the trajectory of the first electronic device with a difference between locations from the poses determined at the successive positions along the trajectory; and providing, for display on the first electronic device, an arrow oriented in a direction based on the locations from the poses determined at the successive positions if the difference between range values matches the distance between locations.

20. A device comprising:

a memory; and at least one processor configured to:

at each position of a plurality of positions along a trajectory of a first electronic device within an area:

determine a range value corresponding to a distance between the first electronic device and a second electronic device;

determine a pose of the first electronic device with respect to a reference coordinate system; and set and store an anchor point corresponding to the determined range value and pose;

receive an update to an anchor point set for a current position of the first electronic device;

update the determined pose corresponding to one or more of the set anchor points based on the update to the anchor point set for the current position of the first electronic device; and estimate a location of the second electronic device based on the range values and poses corresponding to the set anchor points.

* * * * *